(12) United States Patent
Oppenheimer et al.

(10) Patent No.: US 7,130,051 B2
(45) Date of Patent: Oct. 31, 2006

(54) TELESCOPE ACCESSORY

(75) Inventors: Ben R. Oppenheimer, New York, NY (US); Michael M. Shara, Edgewater, NJ (US)

(73) Assignee: American Museum of Natural History, New York, NY (US)

( * ) Notice: Subject to any disclaimer, the term of this patent is extended or adjusted under 35 U.S.C. 154(b) by 444 days.

(21) Appl. No.: 10/736,940

(22) Filed: Dec. 16, 2003

(65) Prior Publication Data

US 2004/0156087 A1 Aug. 12, 2004

Related U.S. Application Data

(60) Provisional application No. 60/446,957, filed on Feb. 12, 2003.

(51) Int. Cl.
*G01N 21/55* (2006.01)
*G01N 21/47* (2006.01)
*G01J 5/02* (2006.01)

(52) U.S. Cl. .................. 356/445; 356/446; 250/353

(58) Field of Classification Search ........ 356/445–448; 250/353, 370.08, 227.29, 203.1; 359/601, 359/429
See application file for complete search history.

(56) References Cited

U.S. PATENT DOCUMENTS 3,963,328 A 6/1976 Abel ........................ 359/859
5,291,333 A 3/1994 Mills et al. .................. 359/601
5,450,352 A 9/1995 Ftaclas et al. ........... 356/124.5

OTHER PUBLICATIONS

James P. Lloyd, et al., "Astronomical Coronagraphy with High Order Adaptive Optics", Proc. SPIE . vol. 4490, pp. 290-297, (Dec. 2001).
E.E. Bloemhof, et al., "Behavior of Remnant Speckles in an Adaptively Corrected Imaging System" Astrophysical Journal, 558:L71-L74, Sep. 1, 2001.
B,R. Oppenheimer, et al., "A Coronagraphic Survey For Companions Of Stars Within 8 Parsecs", Astrophysical Journal 121:2189-221, Apr. 2001.

*Primary Examiner*—Gregory J. Toatley, Jr.
*Assistant Examiner*—Amanda Merlino
(74) *Attorney, Agent, or Firm*—Davidson, Davidson & Kappel, LLC

(57) ABSTRACT

In an embodiment according to the present invention, a coronagraph for detecting reflective bodies external to a light source is provided. A first mirror for directing a beam of light onto an occulting mask is adjusted based on a data from a fiber optic sensor or a second sensor. An occulting mask for separating the beam into a first and second portion directs the first portion onto a fiber optic sensor and the second portion onto a Lyot stop. The occulting mask is adjustable based on data from the second sensor. The Lyot stop separates the second portion of the beam into a third and fourth portion. The Lyot stop also directs the third portion of the beam onto the second sensor and the fourth portion of the beam onto a camera for detecting one or more reflective bodies external to a light source.

21 Claims, 11 Drawing Sheets

TELESCOPE ACCESSORY

BACKGROUND INFORMATION

Astronomers can image the environments of nearby stars on scales comparable to our own solar system. New classes of astrophysical objects have been discovered including circumstellar debris disks, brown dwarfs, and super-Jupiter mass planets. These discoveries have galvanized intense public interest in science and technology and have led to profound new insights into the formation and evolution of planetary systems such as our own. Among the key technologies that have enabled this are adaptive optics (AO) and coronagraphy, both of which deliver the high image contrast for the discovery and characterization of faint stellar companions and circumstellar disks in the solar neighborhood. The highest order AO system available to the astronomical community in the United States is the Air Force Advanced Electro-Optical System (AEOS), located at the Air Force Research Laboratory's (AFRL) Maui Optical Site (AMOS) on Maui.

AEOS is a 3.67-meter telescope owned by the Department of Defense. The 75-ton AEOS telescope points and tracks very accurately, yet is fast enough to track both low-Earth satellites and missiles. AEOS can be used simultaneously by many groups or institutions because its light can be channeled through a series of mirrors to seven independent coudé rooms below the telescope. Employing sophisticated sensors that include an adaptive optics system, radiometer, spectrograph, and long-wave infrared imager, the telescope tracks man-made objects in deep space and performs space object identification data collection. This is part of Strategic Command's Space Surveillance effort.

AEOS is equipped with an adaptive optics system, the heart of which is a 941-actuator deformable mirror that can change its shape to remove the atmosphere's distorting effects. Using this, scientists can gather near diffraction-limited images of space objects.

To block light from a bright star in order to detect faint, nearby objects, a coronagraph is used. The optical elements in the coronagraph are used to create an image of the pupil plane, essentially an image of the telescope's primary mirror, and any support structures which enter the telescope's beam path. These elements scatter a substantial amount of light and degrade the contrast of the final image produced by the telescope. For example, the bright spikes present around stars in many astronomical images are a result of diffraction around the secondary mirror support spider. Faint objects located on or near these spikes are very difficult to detect. To suppress this scattered light, an occulting spot and a Lyot stop (e.g., Lyot mask) are used. The occulting spot is placed at the focal plane of the telescope and at a location coincident with the image of a bright source of light (such as a star or bright satellite). This removes a large fraction of the light from the bright source, while having virtually no effect on other light sources elsewhere in the image. This also reduces subsequent scattering due to light striking any optical elements further down in the optical path. Without the occulting spot, light from the star would saturate the detection device, and the optical elements would fill the background with scattered light, as well as produce spurious reflections. The Lyot stop is used to block the diffracted light from the bright source due to the telescope support structures and the occulting spot, so that stars imaged with a coronagraph do not have diffraction spikes. The diffraction by the occulting spot leaves a ring of residual light from the bright source in a subsequent image of the pupil plane. The Lyot stop blocks this bright ring, substantially reducing the broad halo of light observed in telescopic images of bright sources. The removal of the diffraction spikes and the halo allows for imaging of faint sources near the star. However, it has not been previously possible to observe a planet which is orbiting a star (other than the sun) with a coronagraph. In some cases of observing the planets, the contrast can be larger than 1 part in billions. It has also not been possible to observe microsatellites placed near larger satellites. These microsatellites can be used to destroy larger satellites.

SUMMARY

In a first embodiment according to the present invention, a coronagraph for detecting reflective bodies external to a light source is provided. The present invention according to the first embodiment comprises a first mirror for directing a beam of light onto an occulting mask. The first mirror is adjustable based on a data from a fiber optic sensor or a first sensor. An occulting mask for separating the beam into a first and second portion is also provided. The occulting mask directs the first portion onto a fiber optic sensor and the second portion onto a Lyot stop. The occulting mask is adjustable based on data from the second sensor. The Lyot stop separates the second portion of the beam into a third and fourth portion. The Lyot stop directs the third portion of the beam onto the second sensor and the fourth portion of the beam onto a camera for detecting one or more reflective bodies external to a light source.

In a second embodiment of the present invention, a method for detecting reflective bodies external to a light source is provided. A first portion of a beam of light is detected at a fiber optic sensor after the beam has passed through an occulting mask. Based on a data from the fiber optic sensor, a first mirror or an occulting mask is adjusted. A second portion of a beam of light is detected at a second sensor after the beam has reflected off of a Lyot Stop. Based on a data from the second sensor, the first mirror or the occulting mask is adjusted. A third portion of the beam is detected at a camera after the beam has passed through the Lyot Stop. The third portion of the beam comprises light from one or more reflective bodies external to a light source.

In a third embodiment of the present invention, a coronagraph for detecting reflective bodies external to a light source is provided. A first mirror directs a beam of light onto an occulting mask. The first mirror is adjustable based on a data from a first sensor or a second sensor. An occulting mask separates the beam into a first and second portion, each portion is then directed to a separate plane. The first portion is further directed onto a first sensor and the second portion is further directed onto a Lyot stop. The occulting mask is adjustable based on data from the second sensor. The Lyot stop separates the second portion of the beam into a third and fourth portion. The Lyot stop directs the third portion of the beam onto the second sensor and the fourth portion of the beam onto a camera for detecting one or more reflective bodies external to a light source.

DETAILED DESCRIPTION OF THE PREFERRED EMBODIMENTS

Figure 1:
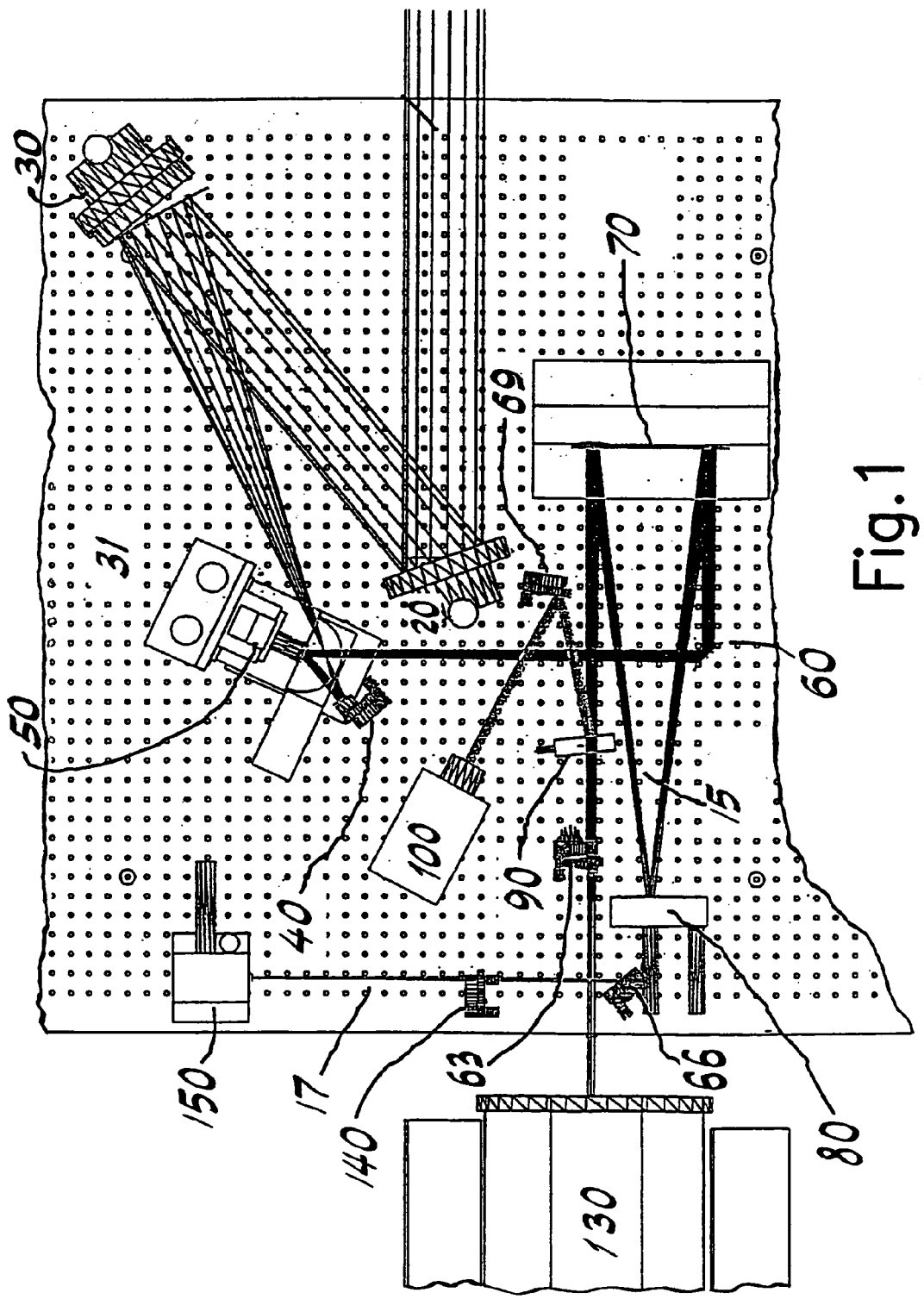
FIG. 1 shows a schematic diagram of a coronagraph optical train in accordance with another embodiment of the present invention from overhead.
Figure 2:
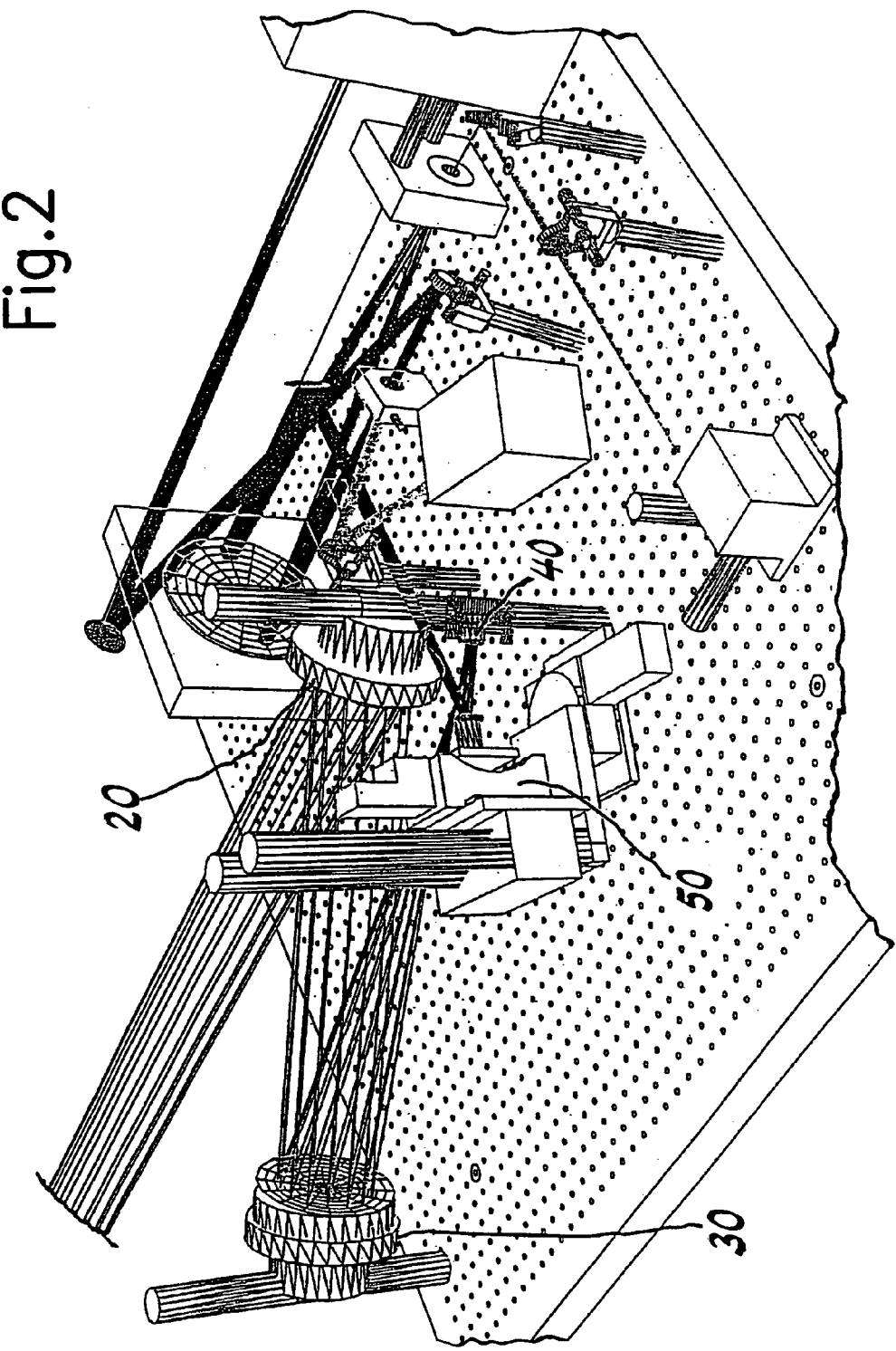
FIG. 2 shows a schematic diagram of the coronagraph optical train of FIG. 1 from a first side.
Figure 3:
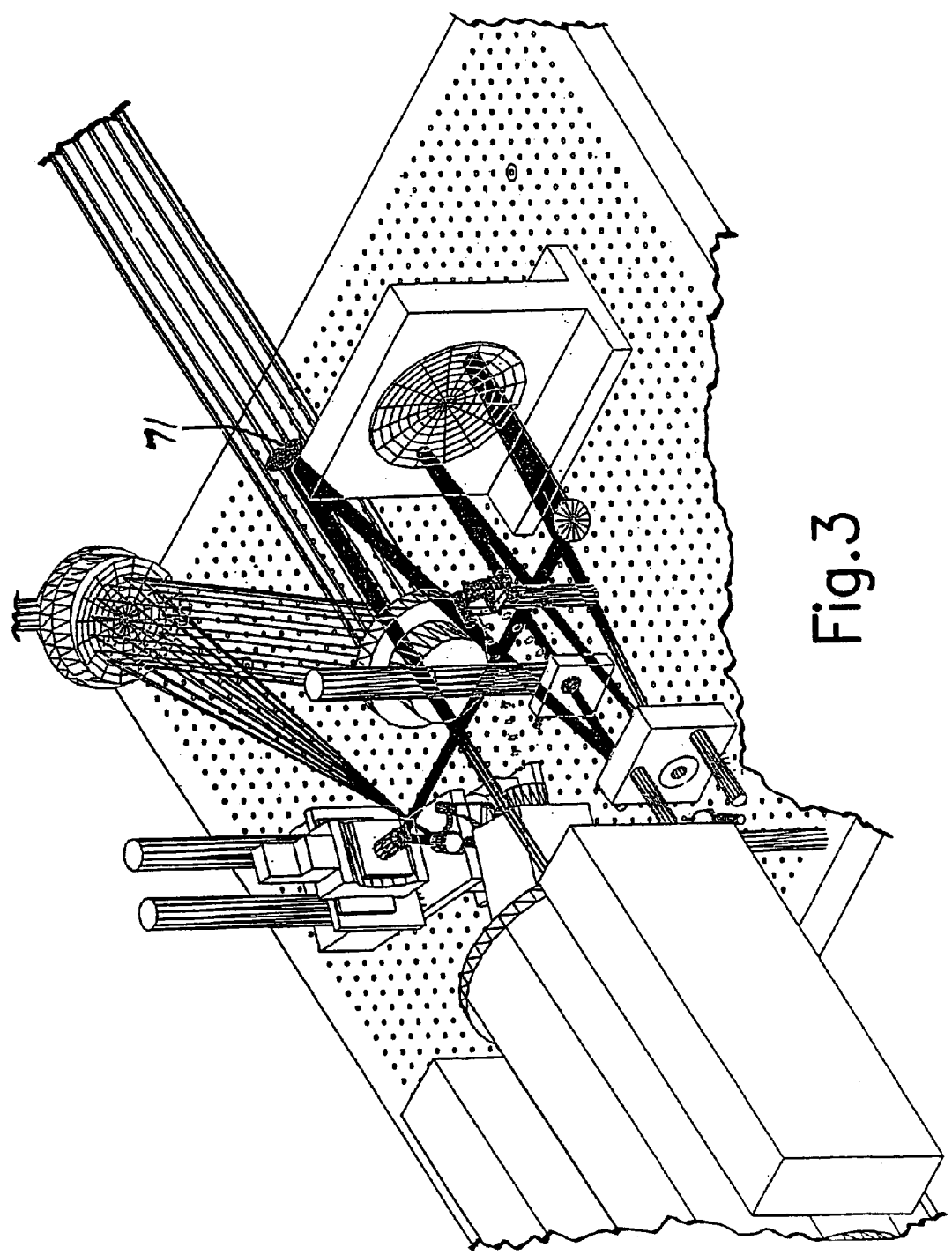
FIG. 3 shows a schematic diagram of the coronagraph optical train of FIG. 1 from a second side.

In an embodiment according to the present invention, a beam of light from a body of interest (e.g., an extrasolar solar system or a satellite cluster) is separated into a first portion and a second portion by an occulting mask. The beam is directed onto the occulting mask by a plurality of mirrors both flat and parabolic. The first portion of the beam impinges a fiber head and the second portion impinges a Lyot stop. The Lyot stop reflects some of the light from the second portion of the beam onto an imaging camera and allows the remainder of the light to pass through. The light that passes through the Lyot stop impinges an IR camera, where bodies external to a light source are detected. Such external bodies can be, but are not limited to, planets orbiting an extrasolar star or smaller satellites orbiting a larger satellite. Based on the data received by the fiber head and/or the imaging camera, the Lyot stop, the occulting mask, and/or the mirrors are adjusted to improve the detection of the external source by maintaining accurate alignment of the optics.

FIG. 1–7 shows a schematic view of a coronagraph optical train from a variety of viewpoints. A beam (e.g., an input beam from a telescope) 10 enters the coronagraph and impinges a BCM (Beam Capture Flat or BCM) 20, which serves to capture the beam into a subsequently aligned path. Preferably, the input beam 10 arrives from a telescope, for example, the AEOS telescope, and comprises light in the IR portion of the spectrum. Preferably, the BCM 20 is at the reimaged telescope pupil and the optic is a 6 inch Zerodur λ/20 flat in a post-mounted kinematic mount. In certain embodiments of the present invention, a deformable mirror can be used in place of or in conjunction with the BCM 20 to permit extremely fine wavefront error correction, either due to incomplete corrections from the AO system in front of the coronagraph or due to further errors introduced by the optics.

Next, the beam 10 is compressed by first and second offaxis parabolas 30,40. Preferably, the beam 10 is compressed by a factor of ten to a 10.48 mm diameter. However, it should be understood by one skilled in the art that the compression factor is given as an example and that other compression factors are also possible. In certain embodiments according to the present invention, the first offaxis parabola 30 could be a 6 inch metal λ/10 optic with a 600 mm focal length, situated 200 mm off axis (giving an 18.42 degree angle to the beam). In such an embodiment, the center of the first optic 30 could be located 200 mm off-axis. Moreover, the second offaxis parabola 40 could be a 25.4 mm diamond-turned aluminum mirror with a gold over nickel coating. In such an embodiment, the second offaxis parabola 40 has a 60 mm focal length and is 20 mm off-axis. The focal length and off-axis placement are used to compensate for the aberrations due to the second offaxis parabola 40. Preferably, the second offaxis parabola 40 reimages the pupil plane about 60 mm after reflection.

The beam 10 is then directed to a Fast Steering Mirror (FSM) 50. Preferably, the FSM 50 is situated 2 cm further along the beam path. The FSM 50 can be a 25.4 mm λ/20 Zerodur flat attached (e.g., by a glue) to a 25 mm aluminum flexure mount activated by a set of 4 PZT (piezoelectric lead zirconate titanate ceramics) stacks. The PZT stacks can located inside a tube for the FSM 50. Preferably, the tube acts as a casing for the 4 stacks. The FSM 50 reflects the beam through a 50 degree angle (i.e., a 25 degree angle of incidence). The mount of the FSM 50 is attached to a spacing plate with screws, which bolts into the faceplate of a goniometric cradle controlled with a stepper motor. Preferably, the axis of rotation of the cradle is at the center of the optic. The cradle is attached through a set of posts and thick plates to a rotation stage, also controlled with a stepper motor. By moving the FSM 50, the trajectory of the beam 10 can be modified, so that it impinges a focal plane mirror 80 (described below) at different locations. Preferably, data received from a fiber head 150 is used to adjust the FSM 50, so as to maximize the amount of light passing through the FPM 80.

With regard to the PZT stacks, the PZT stacks can preferably move the mirror +/−1 mrad (e.g., +/−0.57 arcsec on the sky in this particular manifestation of the coronagraph) at update rates preferably over 2 kHz, and preferably have a resonant frequency of 2.4 kHz or above. The illustrated PZT stacks are mounted on the heavy goniometric cradle and rotation stage to ensure mechanical stability. Preferably, the mount is at least 10 times as massive as the active PZT stage.

The two rotation stages, for example, the goniometric cradle and the rotation stage at the base of FSM 50, are used for placing the body of interest (e.g., extrasolar system or satellite cluster) on a focal plane mask (FPM) 80. Once the star or body of interest is placed in the hole of FPM 80, for example, by using the two rotation stages, the stages are frozen in position and the tip/tilt loop is activated to maintain the precise location of the body of interest on the FPM 80 hole. These motors are inactive when the tip/tilt loop (explained below) is operating, although they could be used to offload the PZT stacks. Preferably, the rotation stages have a precision of 3.6 microarcsec or 17 µrad at the FSM 50 optic. This translates to 10 milliarcsec on the sky. For reference, the focal plane masks are 275 to 500 milliarcsec in diameter (as projected on the sky).

From the FSM 50, the beam impinges a first fold mirror 60. The first fold second, third, and fourth Fold Mirror 60, 63, 66, 69 are used to fold and direct the beam. Preferably, the first, third and fourth fold mirrors 60, 66, 69 are 2 inch $\lambda/20$ Zerodur flats mounted in a post-raised gimbal mount. The second fold mirror 63 could be a Gimbal mounted Fold Mirror with a 1 inch diameter $\lambda/20$ Zerodur and protected silver. The second fold mirror 63 tilts the beam up at an angle so as to impinge an off-axis parabola mirror 71 (not shown in FIG. 1). Preferably, the beam is directed upwards at an angle of 12.7 degrees. However, it should be understood to one skilled in the art that the present invention using the four fold mirrors 60, 63, 66, 69 is offered only as an example, and other configurations with more or less fold mirrors and different angles of reflection are possible.

From the first fold mirror 60, the beam impinges an on-axis parabolic mirror 70 at a point some 140 mm off of the parabola's axis. The parabola 70 serves as the first and third reflections in a pseudo-Offner relay. In addition the pseudo-Offner relay, includes the first reflection off of the parabola 70, the creation of an image at the FPM 80 and the reflection from the FPM 80 back to the opposite side of the optical axis of the parabola 70. This final reflection off of the parabola 70 recolimates the beam. In other words, the first reflection off of parabola 70 reimages the image (e.g., an extrasolar system or satellite cluster) at a focal plane mask 80. The portion of the image that does not pass through the FPM 80 hole reflects back to parabola 70 and is recollimated, producing an image of the telescope pupil at a Lyot stop 90. Preferably, the on-axis parabola 70 is 8 inches in diameter and the beam incident on the mirror is contained within a 140 mm circle centered at the parabola's center. The parabola 70, preferably, has a focal length of 600 mm. Surface accuracy for the parabola 70 can be less stringent since the beam uses only a small region on opposite sides of the optical axis ($\lambda/10$). The mount drawn could accept an 8 inch optic. Moreover, the 600 mm focal length could provide an F/57.25 beam to the image mask.

The parabola 70 directs the beam 10 to a Focal Plane Mask (FPM) 80 (e.g,. an occulting mask) located at the focus of the parabola 70. FIGS. 12(*a–d*) illustrate the FPM 80. A hole 1200 allows the second portion of the beam 17 to pass, while a reflective surface 1210 of the FPM 80 reflects the first portion of the beam 15. A support 1220 is used to move the FPM 80 and provide stability. Preferably, the hole 1200 is not a straight cylinder for more than ¼ of the length of the hole 1200. A bevel 1230, for example, having an angle of 20 degrees, forms the entrance of the hole 1200. The FPM 80 is used to remove the light from an on-axis light source (e.g., the light from the image of a star or non-micro satellite) and reflect light not directly from the on-axis light source (e.g., light from the halo of the star, a faint object near star, or a faint object near a satellite.) Preferably, the focal plane mask 80 is a diamond turned flat mirror two inches in diameter. A hole 1200 is drilled through the center of the optic and beveled on the back side. The hole, ranging from, for example, 275 to 500 µm in diameter, serves as the occulting mask (e.g., the light from the disk of the star is allowed to pass through and any light is reflected.) The starlight that passes through the hole is used to close the tip/tilt control loop. The tip/tilt loop can comprise FSM 50, the third and fourth fold mirrors 66,69, the doublet 140, and the fiber feed 150 with the FSM 50 being adjusted based upon the data received by the fiber feed 150. Preferably, a F/57.25 beam is used with a plate scale on the FPM 80 of 993 µas/µm. Such an optical design provides perfect on-axis imaging at FPM 80. An Off-Axis Parabola mirror 71 (located above the parabola 70) could be mounted on a precision kinematic mount situated above the P mount.

The FPM 80 is on a gimbal mount which is controlled with two DC servo motors. The servo motors can be used to precisely align the pupil with the Lyot stop 90. The alignment could be based, for example, on data from a pupil imaging camera 100 functioning as a second control loop or based on feedback from the fiber head of a fiber feed 150.

From the FPM 80, a first portion of the beam 15 is reflected back to the Parabola 70, and a second portion of the beam 17 passes through the FPM 80 and onto the third fold mirror 66. Preferably, the first portion of the beam 15 comprises the light from the halos from a stellar image, and the second portion 17 of the beam comprises the light from the stellar image itself.

From the third fold mirror 66, the second portion of the beam 17 impinges the doublet 140, and then the Fiber feed 150. Preferably, the third fold mirror 66 provides clearance and directs the beam to the doublet 140.

The doublet 140 focuses the image passing through the FPM 80 hole in front of one or more fiber heads at the fiber feed 150. Preferably, the doublet 140 has a 150 mm focal length, giving an Airy spot diameter of about 200 µm at the fiber feed 150 surface.

Figure 8:
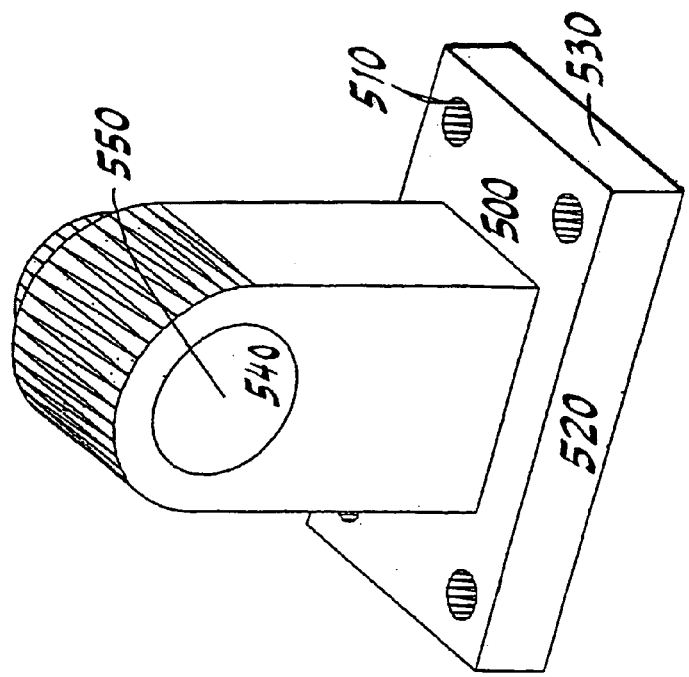
FIG. 8 is a schematic diagram illustrating a more detailed view of the fiber feed of the coronagraph of FIG. 1.
Figure 9:
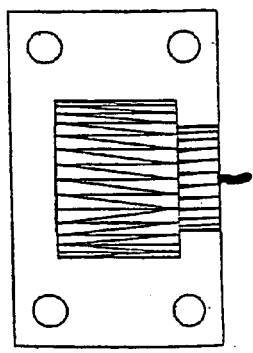
FIG. 9 is a schematic diagram showing the fiber feed of FIG. 8 from overhead.
Figure 10:
FIG. 10 is a schematic diagram illustrating the fiber feed of FIG. 8 from the side.

The Fiber Feed 150 is a set of one or more, for example, four fibers, arranged in a square. An exemplary fiber feed 150 is shown in FIGS. 8–10. Multimode fibers that are 100 to 150 µm in diameter can be used. The image width at the lenslet is, preferably, about 200 µm. Most preferably, a four fiber bundle with a set of four lenslets on a single substrate positioned and aligned to the fiber heads is used (e.g., a "quad-cell" fiber pigtail). The bundle is located inside a fiber head micropositioner actuated with two motors to provide x and y translation of the fiber head in the image plane. The motors permit fiber feed to be positioned at the bright source image (e.g., star or satellite) regardless of where the hole in FPM 80 sits. Fibers can be spaced with the same spacing as the lenslet array in the fiber head. In the prototype described here, the spacing is 127 µm for both the lenslet and the fibers (e.g., they are positioned in contact with each other).

The fiber head can also be placed on an xy motorized stage to position the fiber head on the star image after each pupil realignment. Pupil alignment could, for example, take place between exposures. A small adjustment of the fiber head could be made for motion of the FPM 80 during a pupil realignment. The motorized stage could also be used to permit easy realignment of the tip/tilt optics when the FPM 80 is swapped for a different sized mask. In an embodiment of the present invention using AEOS, the pupil alignment loop (including pupil camera 100 and FPM 80, discussed below) could be operated at a rate faster than once every minute.

In an embodiment according to the present invention, single photon counting modules (e.g., Avalanche Photo-Diodes or APDs) can be attached to the fibers. Preferably, four APDs can be used. The four fibers are connected directly into the APDs, which are housed in an electronics rack enclosure. The data obtained by the detectors can be used to control the tip/tilt loop. In such an embodiment, an update frequency of 2 kHz can be used, so as to provide a signal for the control of the tip/tilt loop. The limiting factor would be the frame rate, not the number of photons available. The throughput of the AEOS system in addition to the throughput to the APDs, allows a sufficient number of photons can be detected in 0.5 ms from stars brighter than 8th magnitude in the 0.7 to 1 µm wavelength range (the range of sensitivity for the APDs) to provide a centroid with a precision of 57 µas. The signal-to-noise requirement would be 800 for an image size of 45 µas, which is the diffraction limit at the signal wavelength. For the brightest stars, a neutral density filter can be added to prevent APD saturation.

Based on the data obtained by the fiber feed 150, various devices of the coronagraph can be adjusted. For example, the devices can be adjusted, so as to maximize the amount of light detected by the fiber feed 150. Moreover, the devices can be adjusted so that the light is evenly distributed over the fiber feeds (e.g., four). For example, the FSM 50 could be rotated to adjust how the light impinges the FPM 80. This would then affect the light impinging the fiber feed. 150. The doublet could also be adjusted to improve the focus on the fiber heads of the fiber feed 150.

The beam 15 reflected off of FPM 80 next intersects the parabola 70 on the opposite side of the parabola's axis from the first reflection prior to reaching FPM 80. This reflection off of parabola 70 collimates the beam and forms an image of the telescope pupil at the Lyot Stop 90.

An exemplary Lyot stop 90 is shown in FIG. 13(a–d). A clear annulus 1305 is formed by an outer reflective ring 1300 and an inner reflective circle 1310. The portion of beam 15 that is incident on the reflective parts of Lyot stop 90 is reflected toward a fourth fold mirror 69 and into the pupil imaging camera 100. A second portion of beam 15 which passes through the clear annulus between 1300 and 1310 continues toward the fold mirror 63. The reflective circle 1310 is secured to the outer reflective annulus via one or more spiders 1320. Preferably, the annuls 1305 has an outer diameter of 7.35 mm, 8.14 mm, or 9.60 mm; and an inner diameter of 4.51 mm, 3.72 mm, or 2.66 mm. The Lyot stop 90 is located at the image of the telescope pupil created by the Parabola 70. The Lyot stop 90 filters the beam 15 to remove the light diffracted by the hole in FPM 80 and the telescope spiders, as well as some of the residual halo from the bright source centered on the hole in FPM 80. Preferably, the pupil image created at the Lyot stop has no optical aberrations. Preferably, the Lyot stop 90 is a metal mirror, configured as shown in FIG. 13. The reflective surface faces the parabola 70 and at a plane conjugate to the telescope pupil. In FIGS. 1–7, the Lyot stop 90 is slightly tilted at a 6 degree angle to reflect the regions of the beam that are not permitted to pass to fold mirror 63 into a Pupil Imaging Camera 100 situated above the FPM 80 (i.e., the light blocked by the Lyot stop 90 is directed to the imaging camera 100) via the Off-Axis Parabola mirror 71. The fourth folding mirror 69 is used in conjunction with the Off-Axis Parabola mirror 71 to direct this light (i.e., the light reflected from the Lyot stop 90) into the pupil imaging camera 100. Preferably, the Lyot stop 90 is mounted on a rotation stage so that the spiders of the Lyot Stop 90 can be matched to any telescope spiders, which may rotate during observations.

The pupil imaging camera 100 permits measurement of Lyot Stop-to-telescope pupil alignment. Data from the pupil imaging camera 100 is used in the pupil control loop to make adjustments to optical devices of the telescope in order to allow detection of light reflected off orbiting bodies around a star. For example, the pupil imaging camera 100 may attempt to maximize the detected halos by adjusting the FPM 80 (e.g., so that the light reflected as the first portion of the beam 15 is modified), or even the FSM 50 (e.g., so that the path of the beam is redirected so as to modify the light impinging the Lyot stop 90). Although the pupil camera 100 is preferably designed for an F/32 beam, over sampling can be used to obtain proper PSF subtraction in the science images. For example, F/71.34 provides a plate scale of 14.73 mas/pixel at the detector. The current design also provides a 49 mm diameter unvignetted FOV at the detector, while the actual detector spans 37 mm, providing a viewable field 30.178 arcsec on a side.

From the Lyot Stop 90, the first portion of beam 15 that passes through the clear annulus of Lyot stop 90 reaches fold mirror 63 and is reflected 12.7 degrees (in this particular manifestation) upward to impinge an Off-Axis Parabola mirror 71 (not shown in FIG. 1). Off-Axis Parabola mirror 71 is a diamond turned metal optic that has a 750 mm focal length, 2 inch diameter, gold over nickel coating, and a λ/10 surface. Preferably, the off axis parabola mirror 71 is manufactured to be 270 mm off axis (measured to center of the optic 70). Preferably, the Off-Axis Parabola mirror 71 is located one focal length away from the Lyot stop 90. The reflection of the first portion of beam 15 off of Off-Axis Parabola 71 creates a new image plane, optically conjugate to the one made at FPM 80, 40 mm in front of the entrance window of an IR camera 130 contained within a cryogenic Dewar. Preferably, the entrance window is 4.9 inches above the base of the Dewar. The IR camera 130 preferably contains a 2048×2048 pixel infrared sensitive array. Based on the data obtained from the fiber head 150 and the pupil imaging camera 100, the beam (or portion thereof) 10 is adjusted so that the light detected at the IR camera 130 is from one or more bodies external to the bright source placed in the hole of FPM 80. Preferably, the majority of the bright source is not propagated to this final image plane.

As noted above, the third fold mirror 66, a doublet 140, the FSM 50 and the Fiber Feed (e.g., a lenslet and fiber assembly as described) 150 comprises the tip/tilt loop. The tip/tilt loop allows the incoming beam 10 or portions thereof to be redirected to improve the quality of the resulting image on the IR camera 130. In the embodiment described above, the tip/tilt loop adjusts the FSM 50 based upon data from the fiber feed 150. However, other arrangements are also possible. For example, the movement of the devices that comprise the tip/tilt loop can be based on data obtained from the IR camera 130, pupil imaging camera 100, and/or the fiber feed 150. For example, based on data from the pupil imaging camera 100, the FSM 50 can be adjusted so that more of the pupil reflected from the Lyot Stop 90 impinges the pupil imaging camera 100. Likewise, based on the data obtained from the fiber feed 150, the FSM 50 or the FPM 80 can be adjusted to maximize the amount of light obtained (e.g., to maximize the beam) or to more evenly distribute the light among the fiber heads. The doublet 140 could also be adjusted, based on the data, to improve the focus of the image on the fiber heads.

Preferably, any tip/tilt correction is done exactly in the pupil to prevent any motion of the pupil image itself. For example, a movement of the FSM 50 of 0.1 arcsec of tip/tilt on the sky corresponds to 36.3 arcsec movement of the pupil at the FSM 50 (assuming that magnification is 363 from the primary to the FSM 50) or 175 µrad. If the pupil is misaligned by 0.1% of a 10 µm beam (10 µm), then 10 mm/175 µrad gives 5.7 cm. 5.7 cm would then be the furthest the FSM 50 can be situated from the pupil plane under such a constraint. Pupil misalignment of a few percent of the beam diameter results in substantial losses in dynamic range in the final image (Sivaramakrishnan A., Koresko C.~D., Makidon R.~B., Berkefeld T., Kuchner M.~J., 2001, Astrophysical Journal, Vol. 552, pp. 397–405). For this reason, the invention is able to maintain the pupil position at the Lyot stop 90, by tilting the FPM 80 with its two motors. The prototype design can keep the pupil image centered on the Lyot stop 90 with a precision of 0.03% of the beam diameter, thus essentially eliminating loss of contrast in the final image due to beam misalignment.

Figure 4:
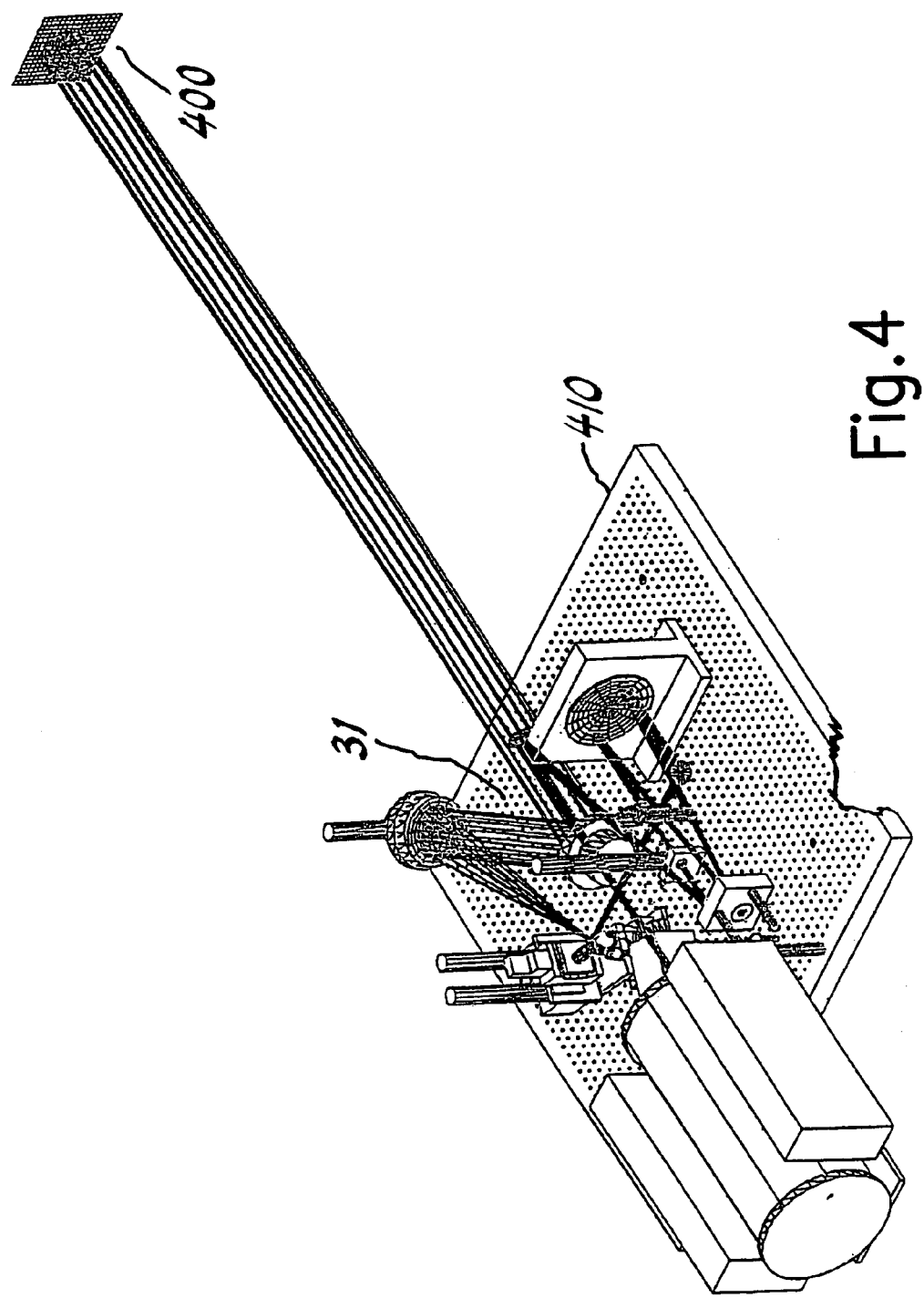
FIG. 4 shows a schematic diagram of the coronagraph optical train of FIG. 1 from the second side showing an input port and the breadboard.
Figure 5:
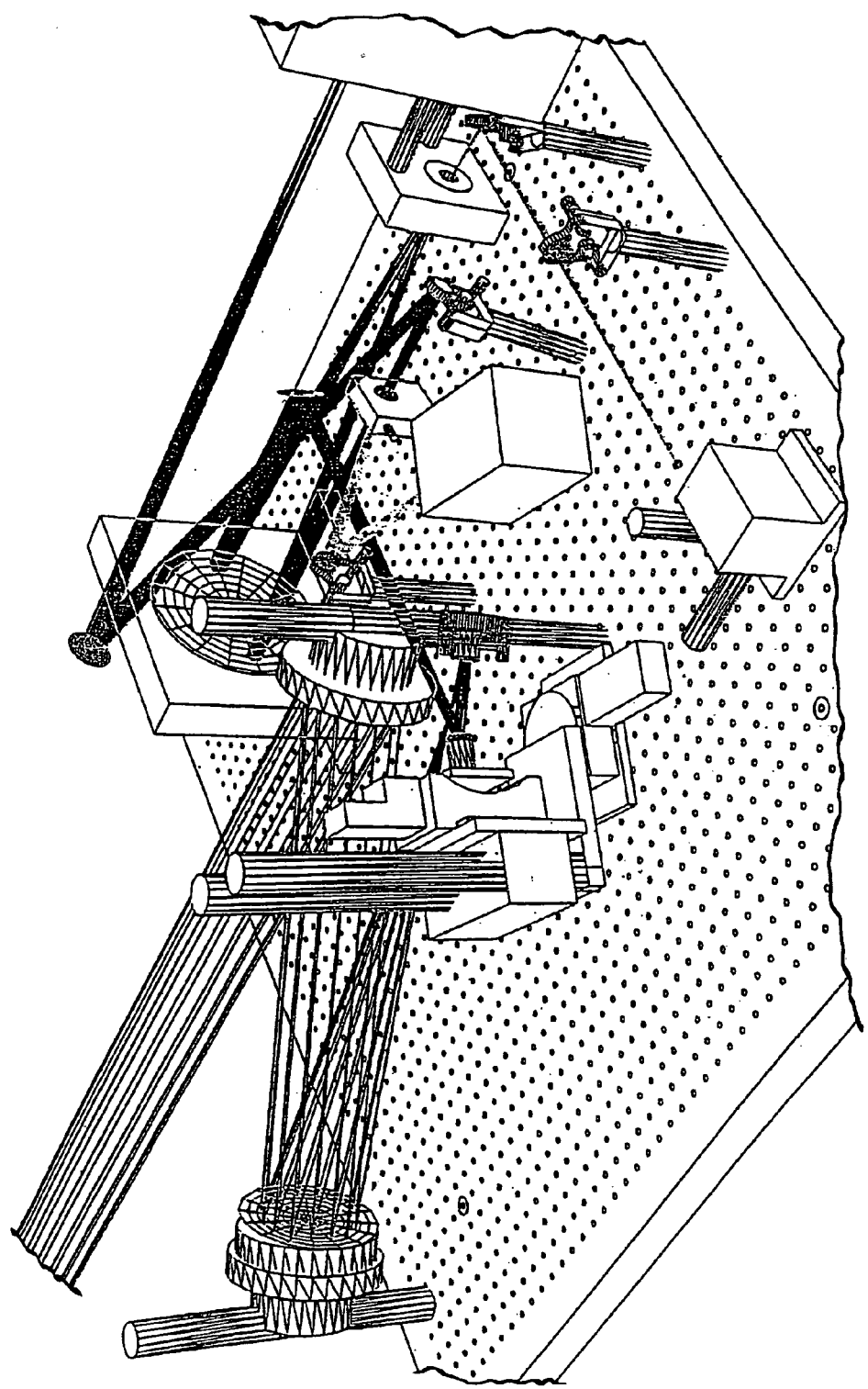
FIG. 5 shows a schematic diagram of the coronagraph optical train of FIG. 1 from a third side.
Figure 6:
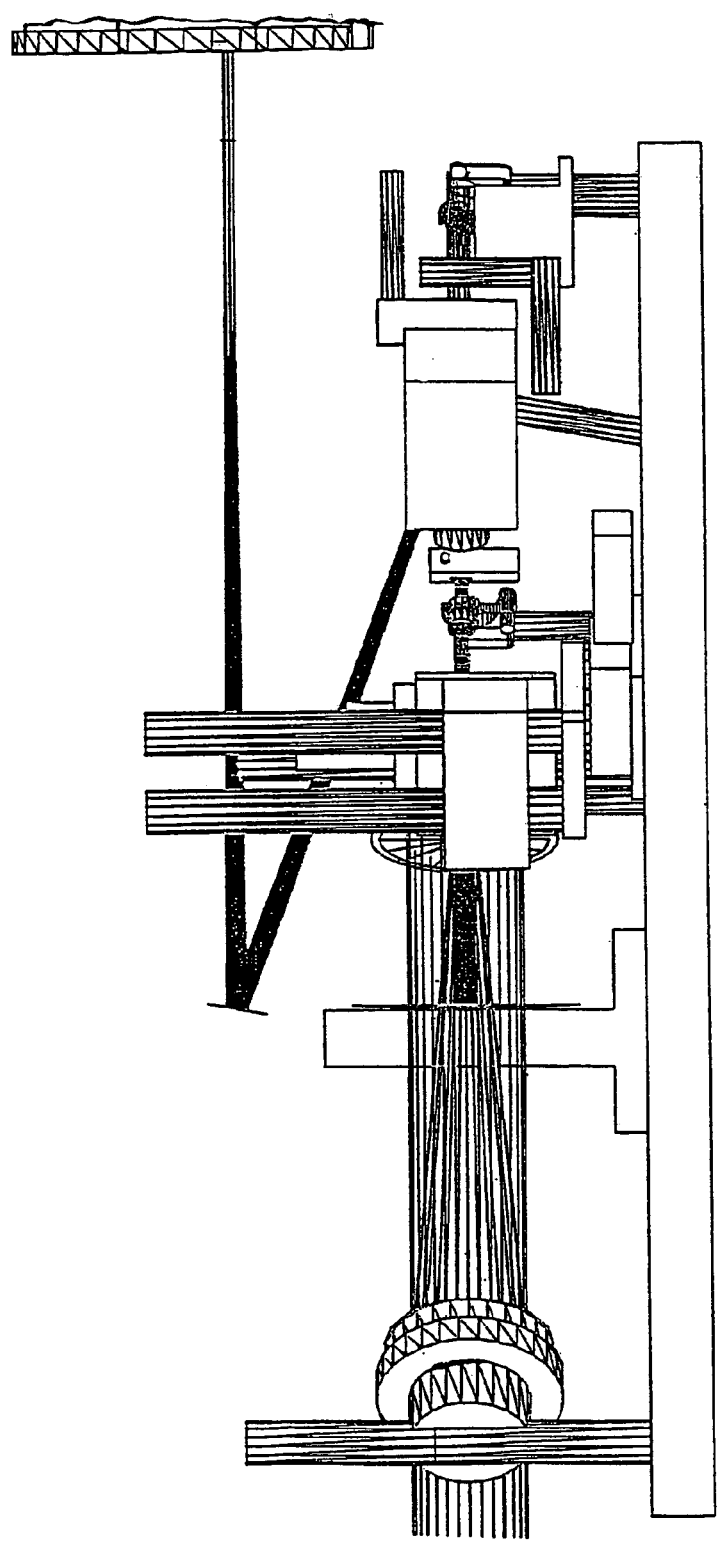
FIG. 6 shows a schematic diagram of the coronagraph optical train of FIG. 1 from a fourth side.
Figure 7:
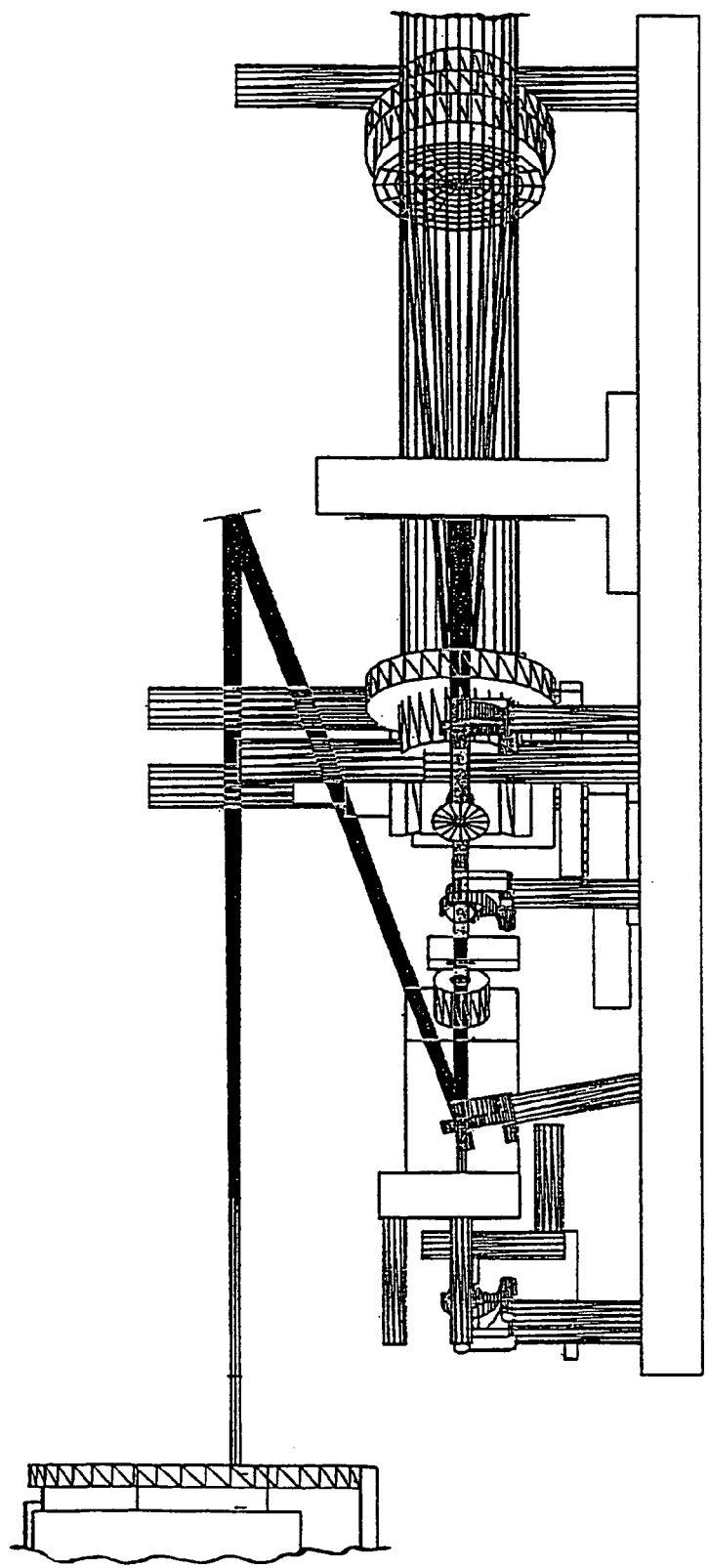
FIG. 7 shows a schematic diagram of the coronagraph optical train of FIG. 1 from a fifth side.

FIG. 4 shows a schematic diagram of the coronagraph optical train from the second side showing an input port 400 and a breadboard 31. Preferably, the input port 400 is in the input port 400 in Room 6 of the AEOS. Preferably, an enclosure 410 is fitted around a breadboard 31 to minimize air currents in the optical path. The breadboard 31 is a 2.2 inch thick, 4×4 foot breadboard that supports all of the devices of the coronagraph, except for the Dewar. The current design has the beam 10 6.25 inches above the surface of the breadboard 31 or 8.45 inches above the optical bench surface. The table at AEOS is 12×4 feet. Its surface can be positioned at 37.75 to 38.5 inches above the room's floor, which places the beam at a height of between 8 and 8.75 inches above the table surface.

FIG. 8 is a schematic diagram illustrating a more detailed view of the fiber feed 150. A breastplate 500 having measurements of 31.8 mm×19.1 mm is shown. The breastplate 500 has four holes 510 centered 3.2 mm from two long sides 520 and 3.4 mm from two short sides 530. A casing 540 contains a group of four lenslets 550. Preferably, each of the lenslets 550 is 100 microns square and aligned with one of four fiber heads (not shown). The fiber heads are also contained in the casing and are each connected to a cable (shown below).

FIG. 10 is a schematic diagram illustrating the fiber feed from the side. A bundle 700 of four fibers 710 exit the casing 540. The bundle separates into the four fibers 710 about 3 m from the casing 540. A first end of the fibers 710 each connect to a fiber head that is placed behind a lenslet. A second end of the fibers 710 each connect to a one or more photon diodes for photon counting.

Figure 11:
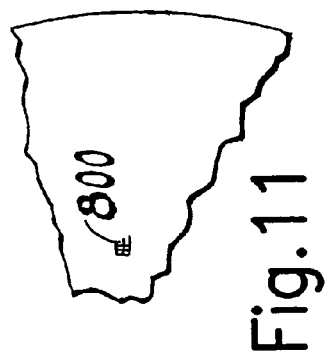
FIG. 11 illustrates four lenslets arranged in a grid of the coronagraph of FIG. 1.

FIG. 11 illustrates four lenslets 800 arranged in a grid. Preferably, each of the lenslets 800 is 125 microns across and arranged in a square with a complete covering fraction (i.e., there is no gap between the quadrants). Most preferably, the distance between the center of each lenslet 800, except for the lenslets 800 diagonal from each other, is 0.127±0.010. Each lenslet 800 feeds one of four fibers 710 which exit the casing 540. Preferably the fibers 710 are kept at a temperature of about 65 to 70 deg. F., and are designed to transmit light from 400 nm to 1000 nm in wavelength.

Figure 14:
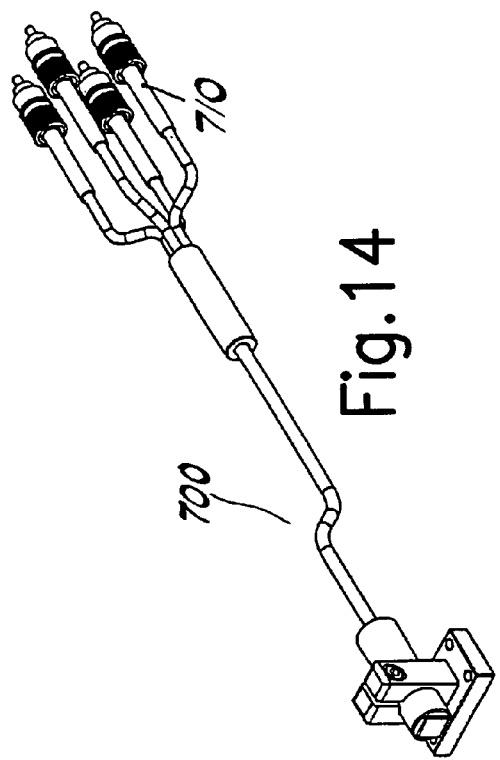
FIG. 14 illustrates a schematic side view of the fiber.
Figure 15:
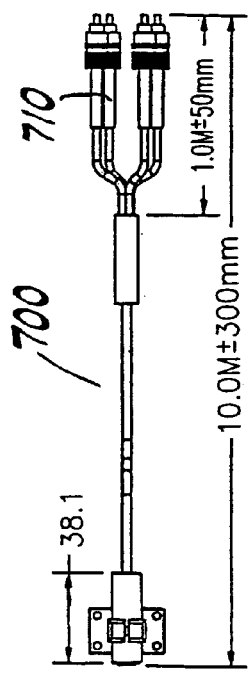
FIG. 15 illustrates a schematic top view of the fiber.
Figure 11A:
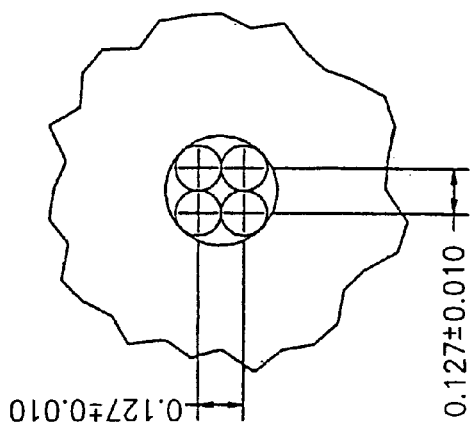
Figure 12A:
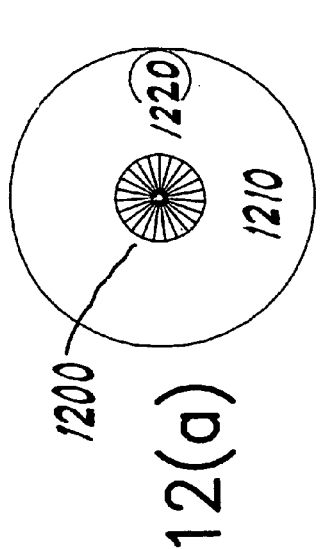
FIG. 12(A) is a schematic view the FPM of the coronagraph from the front.
Figure 12B:
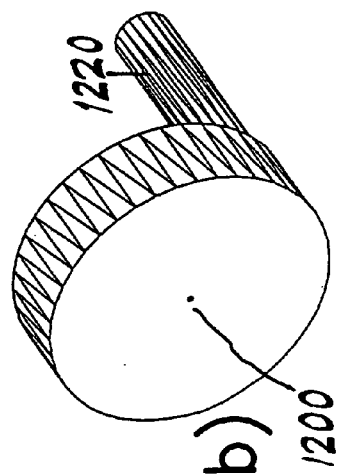
FIG. 12(B) is a schematic view of the FPM of the coronagraph from a first side.
Figure 12C:
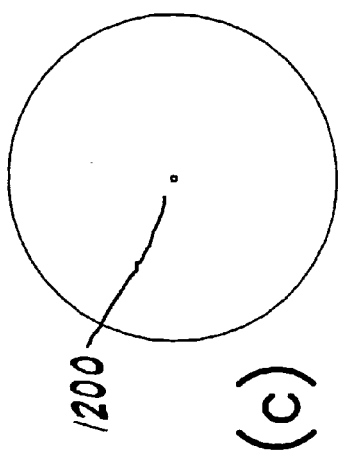
FIG. 12(C) is a schematic view of the FPM of the coronagraph from the rear.
Figure 12D:
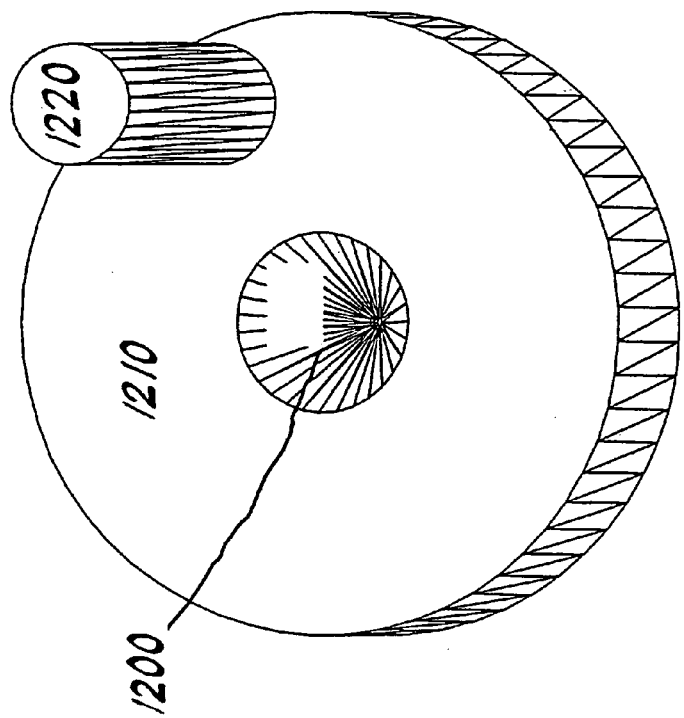
FIG. 12(D) is a schematic view of the FPM of the coronagraph from a second side.
Figure 13D:
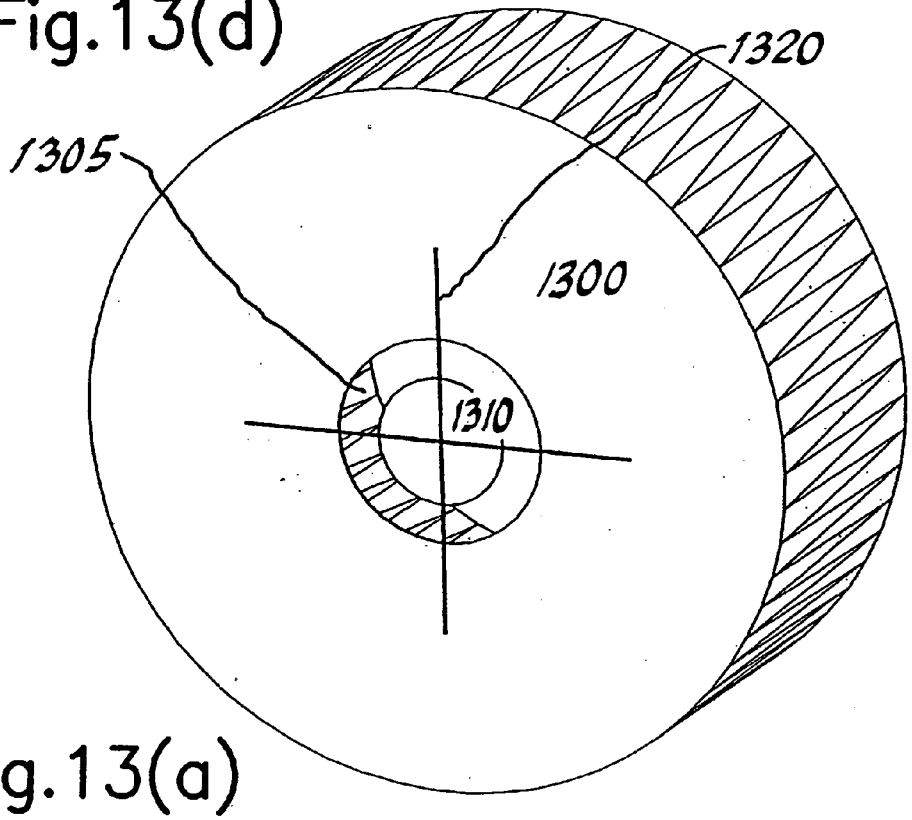
FIG. 13(d) is a schematic view, of the Lyot Stop of the coronagraph of FIG. 1 from a second side.
Figure 13A:
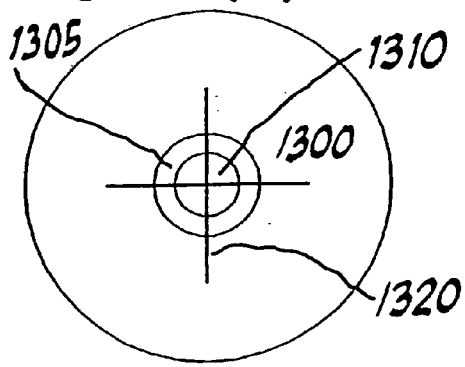
FIG. 13(a) is a schematic view of the Lyot Stop of the coronagraph of FIG. 1 from the front.
Figure 13B:
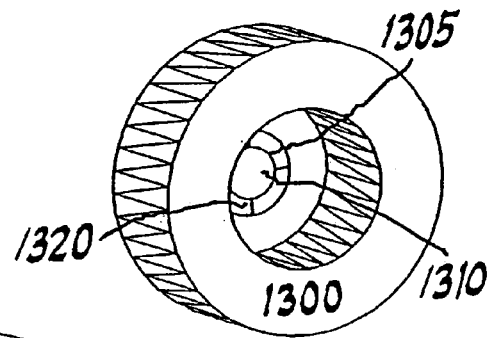
FIG. 13(b) is a schematic view of the Lyot Stop of the coronagraph of FIG. 1 from a first side.
Figure 13C:
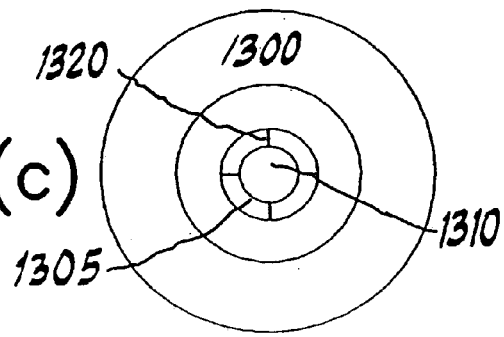
FIG. 13(c) is a schematic view of the Lyot Stop of the coronagraph of FIG. 1 from the rear.

FIGS. 14 and 15 show a more detailed view of the bundle 700 and the four fibers 710. Preferably, the fiber type is AFH/125Y (acrylate jacket), NA=0.26. A nickel plate is used at the stripped section on the fiber in the common end to reduce crosstalk. Preferably, the bundle is sheathed in PVC break-out tubing with Kevlar reinforced strands.

It should be noted that the specific values used throughout the document when referring to the coronagraph are merely exemplary, and other values could be sued in their place.

What is claimed is:

1. A coronagraph for detecting reflective bodies external to a light source comprising:
    a first mirror for directing a beam of light onto an occulting mask, the first mirror adjustable based on a data from a fiber optic sensor or a second sensor;
    an occulting mask for separating the beam into a first and second portion, the occulting mask directing the first portion onto said fiber optic sensor and the second portion onto a Lyot stop, the occulting mask adjustable based on data from the second sensor;
    the Lyot stop for separating the second portion of the beam into a third and fourth portion, the Lyot stop directing the third portion of the beam onto the second sensor and the fourth portion of the beam onto a camera for detecting one or more reflective bodies external to a light source.

2. The method as recited in claim 1 wherein the first mirror comprises one or more PZT stacks.

3. The method as recited in claim 1 wherein the occulting mask comprises an entrance formed as a bevel.

4. The method as recited in claim 1 further comprising a doublet for directing the first portion onto the fiber optic sensor.

5. The method as recited in claim 1 further comprising a one or more directing mirrors for directing the first portion onto the fiber optic sensor.

6. The method as recited in claim 1 wherein the fiber optic sensor comprises one or more fiber feeds.

7. The method as recited in claim 1 wherein the fiber optic sensor comprises a lenslet.

8. A method for detecting reflective bodies external to a light source comprising:
    detecting a first portion of a beam of light at a fiber optic sensor after the beam has passed through an occulting mask;
    based on a data from the fiber optic sensor, adjusting a first mirror or an occulting mask;
    detecting a second portion of a beam of light at a second sensor after the beam has reflected off of a Lyot Stop;
    based on a data from the second sensor, adjusting the first mirror or the occulting mask; and
    detecting a third portion of the beam at a camera after the beam has passed through the Lyot Stop, the third portion of the beam comprising light from one or more reflective bodies external to a light source.

9. The method as recited in claim 8 wherein the first mirror comprises one or more PZT stacks.

10. The method as recited in claim 8 wherein the occulting mask comprises an entrance formed as a bevel.

11. The method as recited in claim 8 further comprising the step of focusing the first beam of light onto the fiber optic sensor via a doublet.

12. The method as recited in claim 8 further comprising the step of directing the first beam of light onto the fiber optic sensor via a one or more directing mirrors.

13. The method as recited in claim 8 wherein the fiber optic sensor comprises one or more fiber feeds.

14. The method as recited in claim 8 wherein the fiber optic sensor comprises a lenslet.

15. A coronagraph for detecting reflective bodies external to a light source comprising:
    a first mirror for directing a beam of light onto an occulting mask, the first mirror adjustable based on a data from a first sensor or a second sensor;
    an occulting mask for separating the beam into a first and second portion, each portion directed to a separate plane, the first portion further directed onto said first sensor and the second portion further directed onto a Lyot stop, the occulting mask adjustable based on data from the second sensor;
    the Lyot stop for separating the second portion of the beam into a third and fourth portion, the Lyot stop directing the third portion of the beam onto the second sensor and the fourth portion of the beam onto a camera for detecting one or more reflective bodies external to a light source.

16. The method as recited in claim 15 wherein the first mirror comprises one or more PZT stacks.

17. The method as recited in claim 15 wherein the occulting mask comprises an entrance formed as a bevel.

18. The method as recited in claim 15 further comprising a doublet for directing the first portion onto the fiber optic sensor.

19. The method as recited in claim 15 further comprising a one or more directing mirrors for directing the first portion onto the fiber optic sensor.

20. The method as recited in claim 15 wherein the fiber optic sensor comprises one or more fiber feeds.

21. The method as recited in claim 15 wherein the fiber optic sensor comprises a lenslet.

* * * * *